US009898709B2

(12) United States Patent
Anisingaraju et al.

(10) Patent No.: US 9,898,709 B2
(45) Date of Patent: Feb. 20, 2018

(54) METHODS AND APPARATUS FOR ANALYSIS OF STRUCTURED AND UNSTRUCTURED DATA FOR GOVERNANCE, RISK, AND COMPLIANCE

(71) Applicant: Saama Technologies Inc., Campbell, CA (US)

(72) Inventors: Vidya Sagar Anisingaraju, San Jose, CA (US); Suresh Katta, Monte Sereno, CA (US)

(73) Assignee: Saama Technologies, Inc., Campbell, CA (US)

( * ) Notice: Subject to any disclaimer, the term of this patent is extended or adjusted under 35 U.S.C. 154(b) by 0 days.

(21) Appl. No.: 14/986,707

(22) Filed: Jan. 3, 2016

(65) Prior Publication Data

US 2016/0196516 A1    Jul. 7, 2016

Related U.S. Application Data

(63) Continuation-in-part of application No. 14/971,885, filed on Dec. 16, 2015.

(60) Provisional application No. 62/124,799, filed on Jan. 5, 2015, provisional application No. 62/124,814, filed on Jan. 5, 2015.

(51) Int. Cl.
| | |
|---|---|
| *G06F 7/02* | (2006.01) |
| *G06F 17/30* | (2006.01) |
| *G06Q 10/06* | (2012.01) |
| *G06Q 30/00* | (2012.01) |
| *G06F 17/27* | (2006.01) |
| *G10L 25/63* | (2013.01) |

(52) U.S. Cl.
CPC ..... *G06Q 10/0635* (2013.01); *G06F 17/2785* (2013.01); *G06F 17/30864* (2013.01); *G06Q 30/018* (2013.01); *G10L 25/63* (2013.01)

(58) Field of Classification Search
CPC .............. G06Q 10/0635; G06Q 30/018; G06F 17/2785; G06F 19/328; G06F 17/30864; G06F 17/30011
See application file for complete search history.

(56) References Cited

U.S. PATENT DOCUMENTS

| | | |
|---|---|---|
| 5,924,072 A | 7/1999 | Havens |
| 7,483,842 B1 | 1/2009 | Fung et al. |
| 9,348,815 B1 | 5/2016 | Estes et al. |
| 2003/0004790 A1 | 1/2003 | Calderaro et al. |
| 2004/0249510 A1 | 12/2004 | Hanson |
| 2005/0132233 A1 | 6/2005 | James et al. |
| 2006/0212486 A1* | 9/2006 | Kennis .............. G06F 17/30569 |
| 2006/0282302 A1 | 12/2006 | Hussain |
| 2008/0270120 A1 | 10/2008 | Pestian et al. |
| 2009/0187471 A1 | 7/2009 | Beaton et al. |

(Continued)

*Primary Examiner* — Bruce Moser
(74) *Attorney, Agent, or Firm* — Kang S. Lim

(57) ABSTRACT

Methods and apparatuses for organizations to monitor, analyze and respond to unstructured and structured data that is related to their Governance, Risk, and Compliance (GRC) programs. Embodiments of the invention generated mapped Risk Control Matrices (RCMs) and/or insights for improving the GRC process from unstructured and structured data. Natural language processing is employed to process the aggregated data from various data sources to create attributes and contributors. The attributes and weighted contributors are processed to form mapped RCMs and/or GRC-related insights.

21 Claims, 9 Drawing Sheets

(56) References Cited

U.S. PATENT DOCUMENTS

| | | |
|---|---|---|
| 2009/0287642 A1 | 11/2009 | Poteet et al. |
| 2010/0251876 A1 | 10/2010 | Wilder |
| 2011/0016064 A1 | 1/2011 | Barton |
| 2011/0093420 A1* | 4/2011 | Rothenberg ........... G06Q 10/06 706/45 |
| 2012/0102053 A1 | 4/2012 | Barrett et al. |
| 2012/0221486 A1* | 8/2012 | Leidner .................. G06Q 40/08 705/36 R |
| 2012/0296845 A1* | 11/2012 | Andrews ............. G06F 17/2785 705/36 R |
| 2012/0330869 A1 | 12/2012 | Durham |
| 2013/0173612 A1 | 7/2013 | Shah et al. |
| 2013/0297543 A1 | 11/2013 | Treiser |
| 2014/0100922 A1 | 4/2014 | Aycock |
| 2014/0207525 A1 | 7/2014 | Dandekar et al. |
| 2014/0222721 A1 | 8/2014 | Stock et al. |
| 2015/0074020 A1* | 3/2015 | Arpat .................... G06N 99/005 706/12 |
| 2015/0310508 A1 | 10/2015 | Pattekar et al. |
| 2016/0048648 A1 | 2/2016 | Sanchez et al. |
| 2016/0189174 A1 | 6/2016 | Heath |

* cited by examiner

METHODS AND APPARATUS FOR ANALYSIS OF STRUCTURED AND UNSTRUCTURED DATA FOR GOVERNANCE, RISK, AND COMPLIANCE

CROSS REFERENCE TO RELATED APPLICATIONS

The present application claims priority under 35 USC 119(e) to a commonly-owned provisional application entitled "Saama Fluid Analytics Engine (SFAE)", Application No. 62/124,799, filed on Jan. 5, 2015, and also to a commonly-owned provisional application entitled "Emergency Response with Social Governance Risk & Compliance", Application No. 62/124,814, filed on Jan. 5, 2015, both of which are incorporated herein by reference for all purposes.

The present application also is a continuation-in-part and claims priority to a commonly-owned application entitled "Abstractly Implemented Data Analysis Systems and Methods Therefor", application Ser. No. 14/971,885, filed on Dec. 16, 2015, which is incorporated herein by reference for all purposes.

BACKGROUND OF THE INVENTION

Business intelligence (BI) is of utmost importance to businesses. Business intelligence involves performing data analytics to answer questions of interest to the business. An example question may be "What is my sales number for this quarter for a certain region." Another question may be "From available data, who are the customers who may likely be defecting to a competitor." In performing data analytics-based business intelligence (DA-BI), it is necessary to gather data from a variety of sources, organize the data, analyze the data, and present the analytics result in a manner that makes sense to the user.

There are existing software applications for performing DA-BI currently These applications permit the acquisition of data, the organization of stored data, the application of business rules to perform the analytics, and the presentation of the analytics result. In the past, such applications require the use of an expert system integrator company or highly skilled personnel in the IT department (often a luxury that only the largest companies can afford) since these tools require custom coding, custom configuration and heavy customization.

The explosion in the volume of data in the last few years means that the customer now has more data and more variety of data formats to work with. At the same time, customers are demanding more in-depth answers from the available data. This increase in data volume and data formats, as well as the increased need of customers, has created a need to update or change many existing business intelligence applications. However, due to the customized hard coding nature of existing BI-applications, many businesses have not been willing or simply do not have the money and/or time to commit to updating their existing BI system or purchasing a new BI system.

Furthermore, new technologies are now available for data storage, data acquisition, data analysis, and presentation. Big data or cloud computing (whether open-source or proprietary) are some examples of such technologies. Some of these technologies have not yet been widely adopted by the BI industry. Being new, the level of expertise required to make use of these technologies is fairly high since there are fewer people familiar with these technologies. This trend drives up the cost of implementing new BI systems or updating existing BI systems for customers, particularly if the customers desire to make use of the new technologies.

In view of the foregoing, there is a need for a new approach to create and/or update data analytics applications for customers.

SUMMARY OF THE INVENTION

The invention relates, in an embodiment, to a computer-implemented method for obtaining Governance, Risk and Compliance (GRC) insights from aggregated data pertaining to a healthcare organization, the aggregated data including at least unstructured data. The method includes processing the aggregated data using natural language processing to generate a set of attributes, the set of attributes being correlated with metadata pertaining risk factors associated with the health care organization. The method further includes processing the aggregated data using natural language processing to generate a set of contributors, the set of contributors pertaining to the set of attributes. The method additionally includes analyzing, using the set of attributes and the set of contributors, to generate a set of insights, the set of insights representing at least one of a mapped risk control matrix and a set of recommendations to improve at least one attribute in the set of attributes, wherein the set of attributes represent at least one of a set of topics, a set of sentiments, and a set of emotion.

In another embodiment, the invention relates to a computer-implemented method for analyzing data pertaining to at least a health care organization, the analyzing being responsive to a query. The method includes aggregating unstructured data from various data sources to form aggregated data. The method additionally includes processing the aggregated data using natural language processing to generate a set of attributes, wherein the set of attributes are correlated with values of metadata specified in the query, the metadata pertaining experiences with the health care organization that give rise to the unstructured data, wherein the set of attributes represent at least one of a set of topics, a set of sentiments, and a set of emotions. The method also includes processing the set of attributes to generate a set of insights, the set of insights representing at least one of a mapped risk control matrix and a set of recommendations to improve an aspect of a governance, risk, and compliance program of the health care organization.

In yet another embodiment, the invention relates to a computer-implemented method for obtaining recommendations for improving a governance, risk, and compliance program of health care organization, the obtaining recommendations being performed in response to a query. The method includes aggregating unstructured data from various sources to form aggregated data. The method additionally includes processing the aggregated data using natural language processing to generate a set of attributes, the set of attributes being correlated with values of metadata, the metadata pertaining risk factors with the health care organization that give rise to the unstructured data, the values of metadata being specified in the query. The method further includes processing the aggregated data using natural language processing to generate a set of contributors, the set of contributors pertaining to the set of attributes. The method yet includes analyzing, using the set of attributes and the set of contributors, to generate the recommendations, wherein the set of attributes represent at least one of a set of topics, a set of sentiments, and a set of emotions.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

Figure 1:
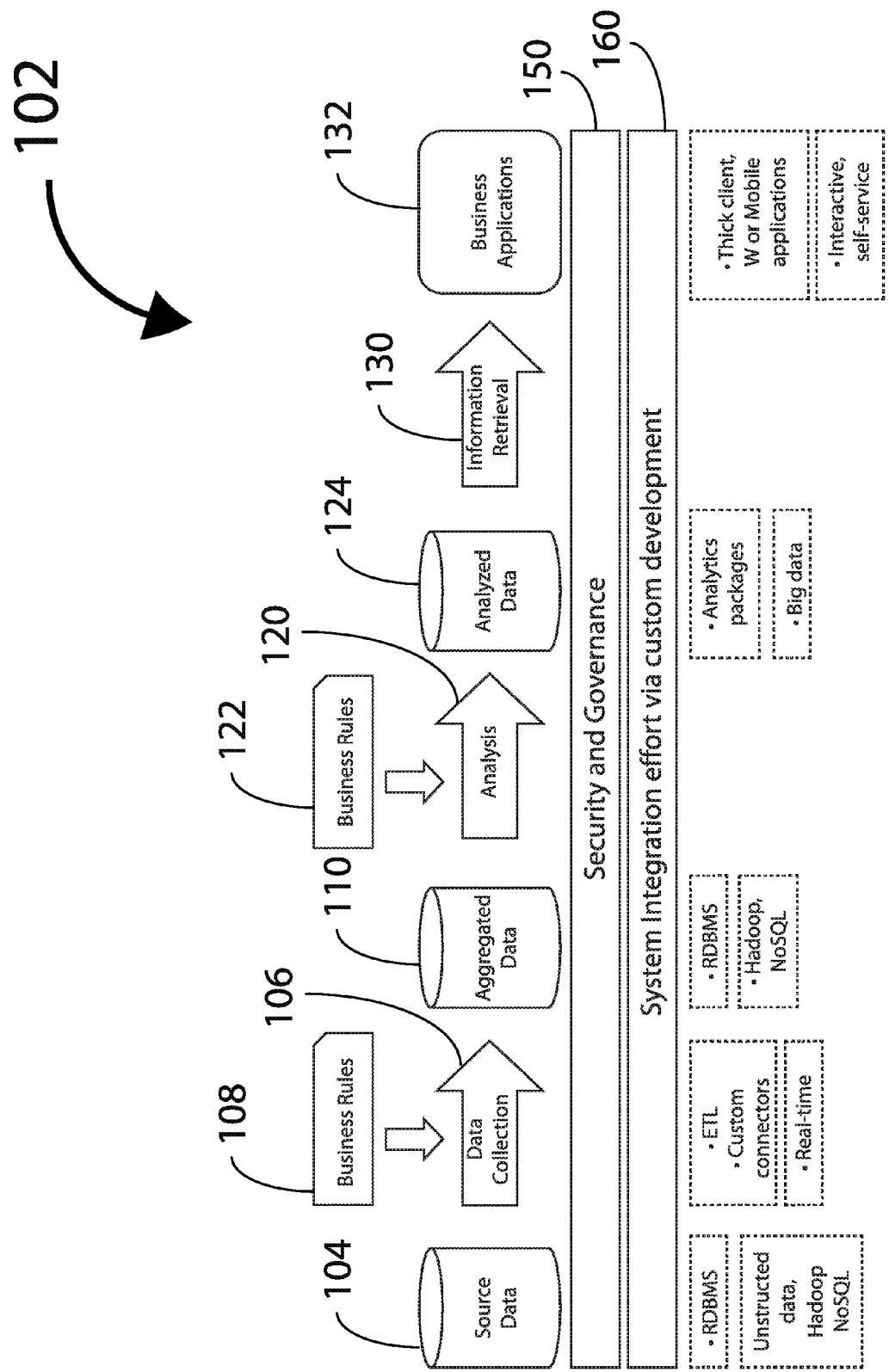
FIG. 1 shows, in accordance with an embodiment of the invention, a typical existing business intelligence (BI) analytics system.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Embodiments of the invention relate to methods and apparatuses for creating data analysis (DA) systems for generating insights (also known as results) from a plurality of data sources without requiring the designer/implementer of the DA system or the user to understand complicated technology details such as for example coding, big data technology or high-end business analytics algorithms.

In one or more embodiments, there exists an abstraction layer, known as a metadata layer, that contains metadata construct pertaining to data definition and design definition for subcomponents of the DA system. The technology details (e.g., what technology is employed to implement a particular subcomponent or to facilitate communication/storage) is abstracted and hidden from the designer/implementer and/or the user. The subcomponents communicate via APIs (application programming interface) to facilitate plug-and-play extensibility and replacement.

The metadata construct (which may be a file or library or collection of files/libraries) contains information on the data definition (what data to expect; the format of the data; etc.) as well as the design definition (what to do with the receive data; how to store, organize, analyze, and/or output the data, etc.) as well as the data flow among the subcomponents. Preferably, the metadata construct is created in advance during design time. At execution time, the execution engine receives the BI query from a user, reads the data in a metadata construct that corresponds to that BI query and executes the BI query using data in the metadata construct to enable the subcomponents to retrieve and analyze data as well as output the BI insight.

In one or more embodiments, a user interface, which may be graphical, is employed to create the metadata construct. In one or more embodiments, the metadata construct is an XML, file. The metadata construct represents a standardized manner to communicate with subcomponents of the BI system and contains instructions on how those subcomponents are to act, alone and in coordination with one another, to transform the data from the various data sources into an analysis result such as a business insight. Since the metadata construct is an abstraction of the underlying technology, embodiments of the invention allow implementers to create an end-to-end BI application that takes in a BI query and automatically provide the BI insight simply by populating or creating content in the appropriate metadata construct (as well as some light customization for data output format if desired).

In this manner, an end-to-end DA application (such as a business intelligence application) can be implemented without requiring the time consuming hard coding and expensive/scarce knowledge regarding the underlying technologies/algorithms. Furthermore, by allowing subcomponents to be implemented in a plug-and-play manner via APIs, it is possible to re-use or leverage existing analytics tools or parts thereof (such as an existing analysis module) by simply providing an appropriate API for the module and generating the data definition and design definition for it in the metadata construct. This is a huge advantage to customers who may have already invested substantially in existing data analysis infrastructure.

These and other advantages of embodiments of the present invention will be better understood with reference to the figures and discussions that follow.

FIG. 1 shows, in accordance with an embodiment of the invention, a typical existing business intelligence (BI) analytics system. In this application, a business intelligence system is used as an example of a data analytics system but it should not be a limitation and the discussion applies to data analytics systems in general.

A BI system 102 receives data from a variety of data sources 104 in a variety of formats. These data sources may include the corporate transactional systems (such as sales or accounting or customer relations), syndicated data (such as from 3rd party), web-based data (such as social media) and streaming data. The data may be stored in a relational database (RDBM) or in big data-related storage facilities (e.g., Hadoop, NoSQL). With regard to format, the data may be in any format including unstructured, structured, streaming, etc.

Data collection 106 pertains to activities required to acquire the data from the data sources 104. Data acquisition may employ ETL (Extract, Transform, Load) technologies or may employ custom connectors to the individual data sources 102 for example. The data collection may happen in batches or in real time.

During data collection, business rules 108 may apply to pre-filter and/or pre-process the data. For example, some syndicated data may be in a specific format to suit the needs of a particular system unrelated to BI (such as reimbursement data from the reimbursement database of insurance companies, which data may include short-hand alphanumeric coding for common procedures and/or medication) and these formats may need to be converted for more efficient utilization by the analysis component later.

The data collected is then stored in an aggregated data source 110 for ready use by the analysis module. The aggregated data may be stored in a relational database (RDBM) or in big data-related storage facilities (e.g., Hadoop, NoSQL), with its formatting pre-processed to some degree (if desired) to conform to the data format requirement of the analysis component.

The analysis component analyzes (120) the data using business rules 122 and stores the BI insight in analyzed data store 124. The analysis may employ some custom analytics packages or may employ big data analysis techniques for example. At some point in time, the user may desire to know the BI insight and thus information retrieval (130) is performed to obtain the BI insight from the analyzed data store 124 and to present the BI insight to business applications 132. These presentation methods may be self-service or interactive (such as through a webpage that allows the user to sort and organize the data in various ways). The presentation medium may be a thick client, a web or mobile application running on a desktop, laptop, or mobile device for example.

Underlying the above activities is a security and governance subsystem 150 that handles house-keeping and system-related tasks such as scheduling jobs, data access authorization, user access authorization, auditing, logging, etc.

In the past, the implementation of BI system 102 typically involves hard-coding the components, creating custom code to enable the components of FIG. 1 to interoperate and produce the desired BI insight. The system integration effort and custom development (160) require a substantial investment of time and effort during the development, integration, and deployment stages. Because of the rapidly changing technology landscape, a typical company often does not have sufficient IT expertise in-house to build, maintain and/or deploy a BI system if that company desires to utilize the latest technology. Instead, the work is contracted out to integrator firms with special expertise at great cost in each of the development, maintenance, deployment, and upgrade phases.

The hard coding approach makes it difficult and/or expensive to upgrade when new BI insight needs arise and/or when improved technology is available for the tasks of data acquisition, data analysis, and/or data presentation. It also makes it difficult to re-use legacy subcomponents that the business may have already invested in the past. This is mainly because of both the cost/time delay involved in re-coding a BI system and the predictable scarcity of knowledgeable experts when new technologies first arrive.

Figure 2:
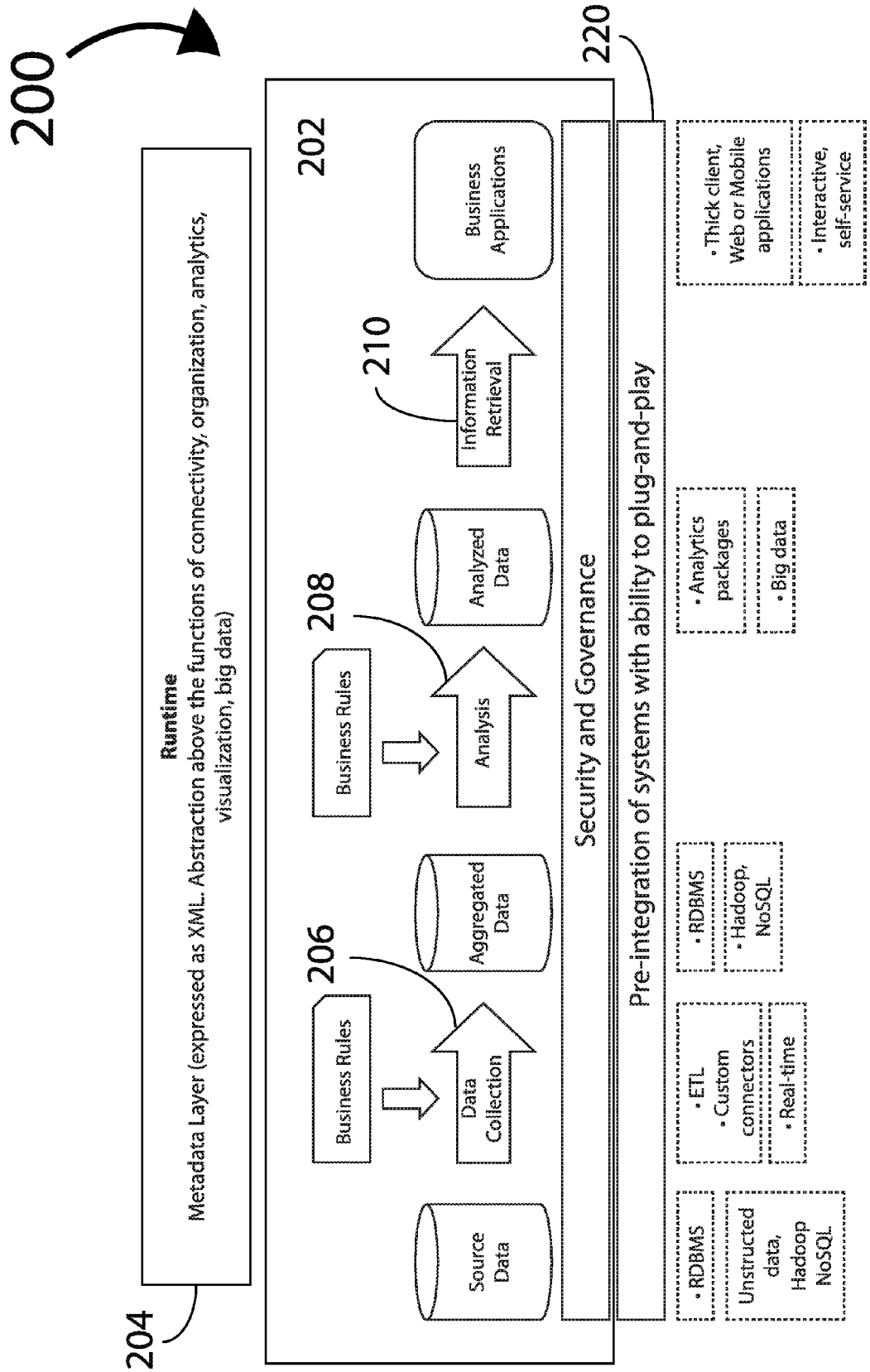
FIG. 2 shows, in accordance with an embodiment of the invention, the conceptual organization of the improved abstractly-implemented data analysis system (AI-DAS)

FIG. 2 shows, in accordance with an embodiment of the invention, the conceptual organization of the improved abstractly-implemented data analysis system (AI-DAS). The conceptual tasks that need to be performed in box 202 are analogous to those discussed in connection with FIG. 1. However, embodiments of the invention pre-integrate (220) the subcomponents (to be discussed later in FIG. 3 and later figures) with plug-and-play capability in order to facilitate their upgradability and extensibility.

More importantly, there exists an abstraction layer, known as a metadata layer 204. The metadata may be implemented by a file or library or a collection of files or libraries and contains data pertaining to the data flow among the subcomponents of components implementing the three tasks of BI system 200 (data collection 206, data analysis 208, and analysis result retrieval/presentation 210). The metadata may also include information about data definition and design definition for each of the subcomponents. Generally speaking, data definition pertains to the location where the data comes from and where it is to be outputted, the format of the data, and the like. Design definition generally pertains to the operation in each subcomponent including for example what to do with the inputted data, how to store, organize, analyze, output the data, etc.

The metadata 204 is designed during design time in order to define the operation of the subcomponents and the data flow among the subcomponents, and by extension, the operation of the resulting BI system for a particular type of query. During design time, the designer/implementer is shielded or isolated from the technology details of the subcomponents. The designer/implementer task becomes one of populating the metadata construct with sufficient information to allow each subcomponent to know what data to expect and to output, and how each subcomponent is to behave during execution. In an embodiment, a graphical user interface is provided to assist in the task of filling out the data fields of the metadata. Because the implementer/designer of the BI system only needs to work at the high level of abstraction of the metadata layer, expensive skilled knowledge regarding the newest technology is not required. Further, because the system can be easily reconfigured (simply by creating another metadata) to handle different analysis tasks or accommodate different/substitute subcomponents, re-use of many of the subcomponents is promoted.

At execution time, the BI query from the user is intercepted and a metadata construct (file, library, or set of files/libraries) appropriate to that BI query is retrieved. The execution engine then reads and interprets the data in the metadata in order to know how to utilize the subcomponents to perform tasks to arrive at the BI insight requested by the BI query. Again, the user does not need know the details of the underlying technologies or even the presence/structure of the metadata itself. As long as the user can input a BI query that can be parsed and understood by the BI system, the BI system will automatically select the appropriate metadata construct and will automatically carry out the required tasks using data from the metadata construct and the subcomponents of the BI system.

Figure 3:
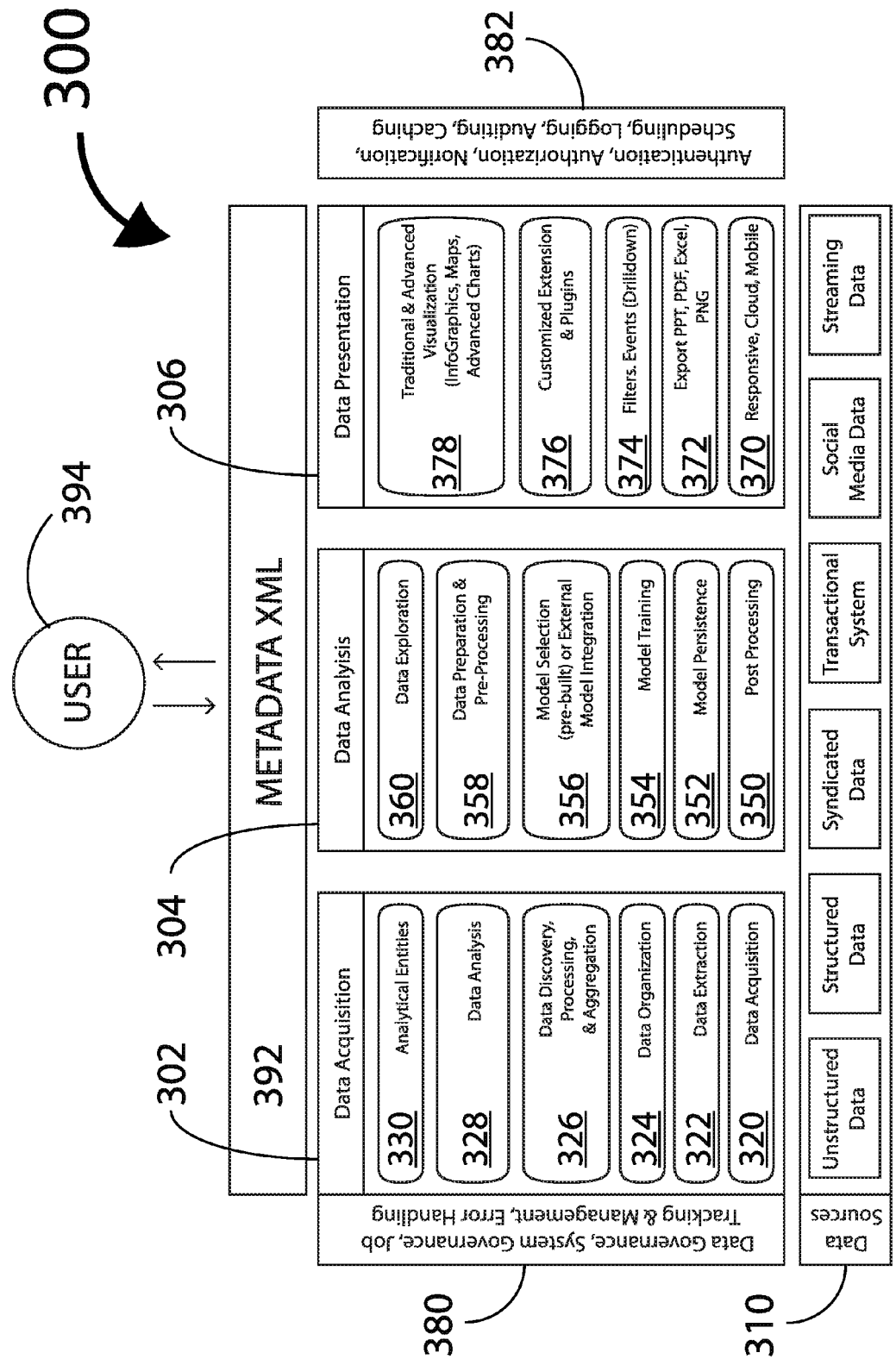
FIG. 3 shows, in accordance with an embodiment of the present invention, the details of one implementation of the abstractly-implemented data analysis system (AI-DAS) system.

FIG. 3 shows, in accordance with an embodiment of the present invention, the details of one implementation of the abstractly-implemented data analysis system (AI-DAS) system 300. AI-DAS 300 includes three main components: Data acquisition, data analysis, and data presentation.

Data acquisition 302 relates to getting the data, organizing the data, extracting the data, storing the data. As shown in box 310, the various data sources include unstructured data (e.g., freeform data such as the text entered by patient comments or doctor/nurse comments), structured data such as data enter into fields of a form, syndicated data such as data purchased or received from third parties, transactional system data such as data directly obtained from the ERP system or the enterprise data store of the company, social media data such as data from Facebook, Twitter, Instagram, and the like. The data may be received in batches or may be streaming data. These are only examples of data sources that may be employed for analysis by the AI-DAS 300.

Within data acquisition component 302, there exist a plurality of subcomponents shown as data acquisition-related subcomponents 320-330. Subcomponent 320 pertains to the task of data acquisition, which relates to how the data is acquired from various sources 310. Subcomponent 322 relates to data extraction, which contains the logic to extract the data sources 310. Subcomponent 324 pertains to data organization, which contains the logic to organize the extracted data. Subcomponent 326 pertains to certain pre-processing of the data. For example, the extracted data is discovered (such as using parsing or artificial intelligence) processed (such as mapping) and aggregated. Splitting and merging of various data items may also be done.

Subcomponent 328 pertain to additional higher level processing of the data, if desired. Subcomponent 330 pertains to grouping data sources into a transactional unit that can be processed as a single entity. For example, the total number of data sources may comprise hundreds of data sources available. However, for a particular BI query, only certain data resources are used. These can be grouped together in a single analytical entity for ease of administration.

Data analysis component 304 relates to analyzing the data and extracting meaning from the aggregated data that is output by data acquisition component 302. Within data analysis component 304, there exists a plurality of subcomponents shown as data analysis-related subcomponents 350-360. Subcomponent 360 relates to data exploration since at this stage, it may not be known what the data contains. Artificial intelligence or pattern matching or keywords may be employed to look for meaning in the data. The data can be prepared and preprocessed in 358 to convert the data into a format for use by the algorithm.

The three subcomponents 352, 354, and 356 represent the machine learning approach that is employed for this example of FIG. 3. In subcomponent 356, the model is selected which may be prebuilt or an external model may be integrated. In subcomponent 354, the model is trained and once the model is selected 356 and trained in 354, the model may be persisted 352 to process the incoming data. Post-processing 350 relates to preparing the data for presentation, which occurs in data presentation component 306.

Data presentation subcomponent 306 relates to how to present the data to the user. The data may be presented using traditional and advanced visualization methods (378) such as infographics, maps, and advanced charts. Legacy presentation tools may also be employed via standard or customized extensions and plug-ins 376. Tool may be provided for the user to filter and to drill down the data, essentially allowing the user to explore the result in 374. The data may also be exported into a desired data format for later use. This is shown 372 wherein the example the formats are PowerPoint, PDF, Excel, PNG. The presentation mechanism can be interactive or static, and presentation data can be sent via the cloud and/or internal network to a laptop, desktop, or mobile device (370).

Subcomponent 380 relates to data governance, system governance, job tracking and management, and error handling. These are tasks related to managing the hardware and software resources to perform the analysis. Subcomponent 382 relates to control of data access and job execution and user access. Thus, there is shown authentication, authorization, notification, scheduling of jobs. Logging, auditing, and intelligent caching of data to improve execution speed are also shown in 382.

A metadata construct 392 is shown interposing between the user 394 and the components/subcomponents of the AI-DAS 300. As mentioned, this metadata contains the higher level abstraction of the subcomponents and allow the AI-DAS to be implemented without knowing the complex underlying technology details.

All the subcomponents shown in each of the data acquisition, data analysis, and data presentation components can be either off-the-shelf, custom created, open-source, or legacy subcomponents. For plug-and-play implementation, these subcomponents preferably communicate using the API model. These subcomponents can be implemented on an internal network, in the cloud using a cloud-based computing paradigm (such as through Amazon Web Services or Google Web), or a mixture thereof. Generically speaking, these are referred to herein as computer resource.

Figure 4:
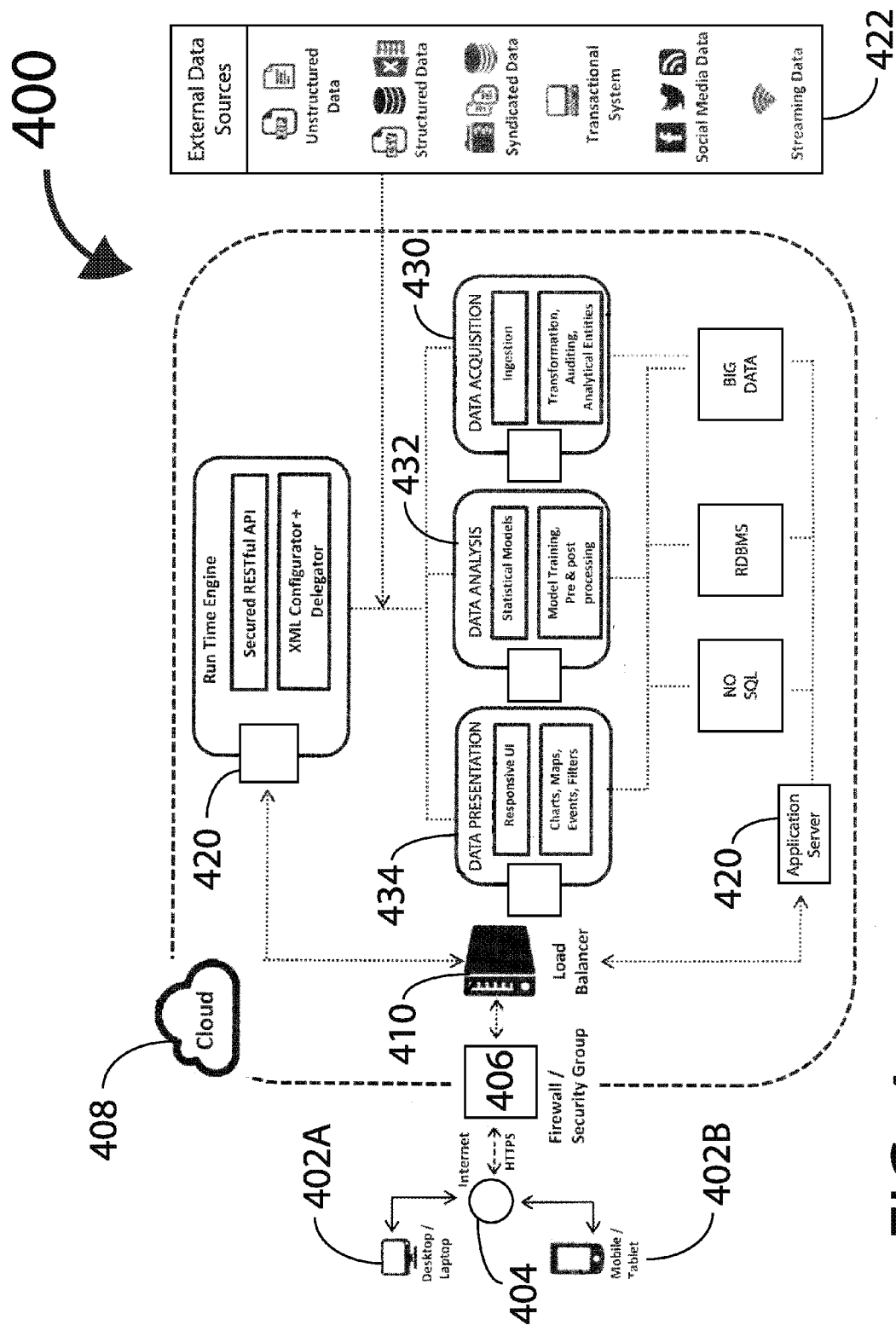
FIG. 4 shows a system architecture of an example AI-DAS implementation.

FIG. 4 shows a system architecture of an example AI-DAS implementation, including user interface devices 402A and 402B (desktop/laptop and mobile devices respectively). These devices can access the AI-DAS system 400 via in the Internet 404 using for example the HTTPS protocol. Firewall/security group 406 and cloud 408 show that components/subcomponents and data storage employed to implement the AI-DAS may reside in the cloud or may reside behind the firewall within a company or can be both.

The AI-DAS operation is governed by a load balancer 410 which load balances multiple copies of the AI-DAS runtime engine 420. For ease of illustration, the multiple implementations of the AI-DAS runtime engine 420 are shown at both the top and the bottom of FIG. 4. At the top of FIG. 4, these multiple instantiations of the AI-DAS runtime engine interacts with the API (such as Secure RESTful API) that governs the communication between subcomponents in the data acquisition component, the data analysis component, and the data presentation component. The AI-DAS runtime engine also reads the metadata (implemented as an XML in the example) and interpret the XML then delegates the tasks specified by the XML to various subcomponents in the data acquisition, data analysis, and data presentation subcomponents.

Data is received from external data sources 422 and is processed via data acquisition subcomponent 430, data analysis subcomponent 432, and data presentation subcomponent 434. The data is processed by data acquisition subcomponent 422 via ingestion module and transformation, auditing, analytical entities. The aggregated and analyzed data is then stored in the appropriate data store (such as Hadoop big data store), relational database RDBMS, or noSQL data store.

The data analysis subcomponent 432 represents the intelligence component and includes therein statistical models and modules related to model training, pre- and post-processing. The data presentation subcomponent 434 includes the various responsive (interactive) user interfaces and may include traditional presentation tools such as charts, maps, events, filters. As shown in FIG. 4, there may be multiple instantiations of each of the components/subcomponents in addition to different instantiations of multiple runtime engines, all of which can be load balanced to horizontally scale the analytics system to accommodate any volume of analytics jobs.

Generally speaking, there are the two separate phases of building and delivering an AI-DAS end-to-end application. One of the requirements is that the subcomponents employ APIs, allowing them to interoperate using an API model and to receive instructions from the execution engine as the execution engine interprets the metadata. Thus, during design time, a designer/implementer may create the metadata XML that includes the data definition and design definition for the subcomponents. Once the design phase is completed, the system is deployed and ready to produce analysis result during execution time.

During execution time (which occurs when a user inputs a query), the metadata XML is selected for the query, interpreted and executed by the AI-DAS engine, which metadata specifies how each subcomponent would behave based on the parameters specified in the metadata. The metadata also specifies the format of the data that the subcomponents exchange among each another, as well as the overall data flow from data intake from multiple data sources to the presentation of the analytic results to the user interface devices.

Figure 5:
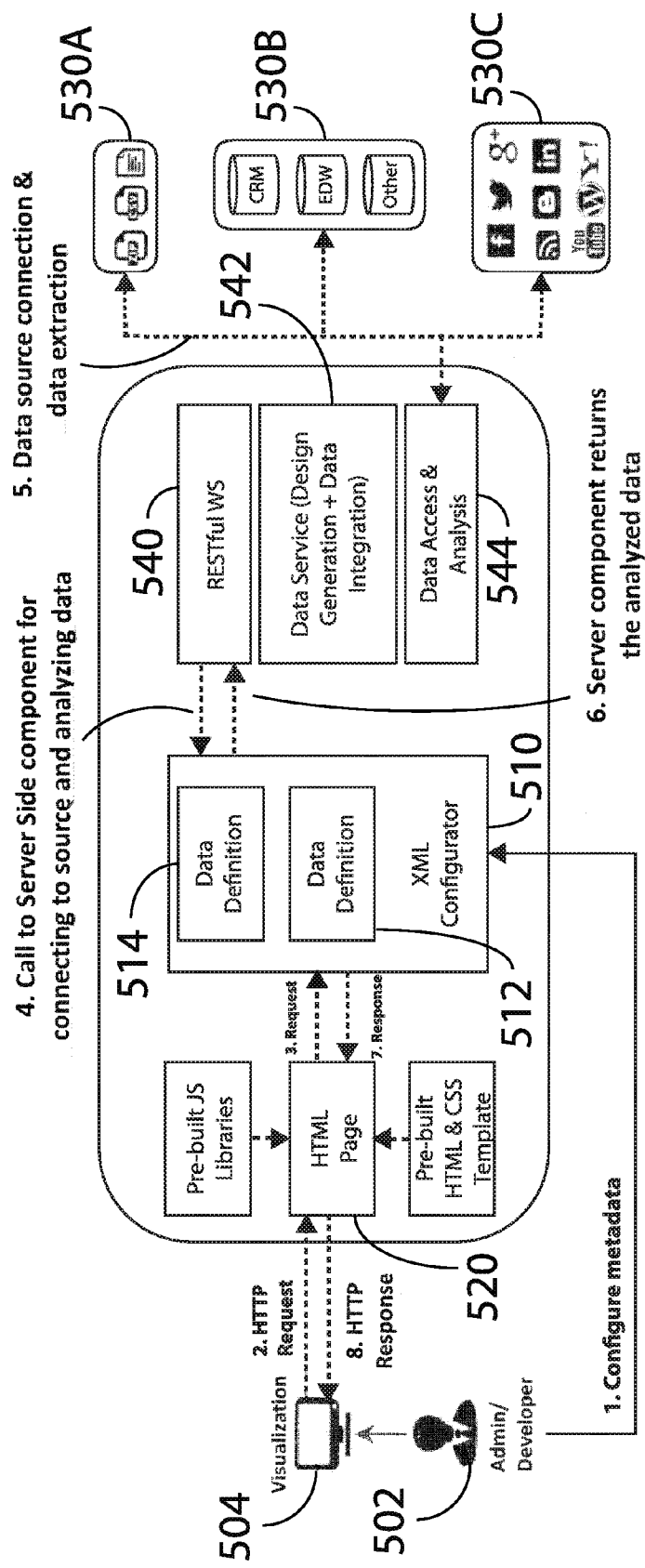
FIG. 5 shows, in accordance with an embodiment of the invention, an example workflow employing the runtime engine in order to perform business intelligence analysis.

FIG. 5 shows, in accordance with an embodiment of the invention, an example workflow employing the runtime engine in order to perform business intelligence analysis. During design time, administrative/developer 502 employs UI device (which may be for example a laptop or desktop computer) 504 to configure the metadata (such as the XML). This is shown as step 1 of FIG. 5. Preferably, a graphical user interface is employed to simplify the task of populating the metadata fields. At this time, any custom HTML templates and custom javascript can also be created to format the output if desired.

With respect to the metadata XML, the admin/developer 502 may define the data. That is the admin/developer may specify where the data comes from and the type of data that is inputted (e.g., free-form, stream, structured, and the like). The admin/developer 502 may also specify the design definition, that is how the data is used in the application. The design definition defines the goal of the data analysis. For example, one goal may be to perform sentiment analysis on conversation data about nurses. Another goal may be to discover the top three hot topics in the unstructured data that is received. Another goal may be to import certain columns in a relational database and run it through a certain model to identify patients who are not satisfied.

The design definition can also specify the manner in which data is outputted. Examples of such specification include the format and the devices and/or data presentation technologies involved. These are shown in 510, 512, and 514 of FIG. 5.

Then during execution time the user may use a UI device to issue a HTTP request (step 2) that is received by the HTML page 520. The HTML page 520 parses the request then issues another request (step 3) to acquire the appropriate associated metadata XML that contains the data definition and the design definition relevant to the instant query.

With this data definition and design definition in the XML, the AI-DAS engine then makes a call to the server-side component for connecting to resources to obtain data and to analyze data. Note that these data sources and the manner in which the data is analyzed are specified by the XML in the data definition and design definition 514 and 512. This is step 4.

In step 5, the data source connections are selected to connect to the appropriate data sources 530A, 530B, and 530C to obtain data for analysis. The analysis is performed by the server subcomponent that employs, in the example of FIG. 5, the RESTful web service 540. Analysis includes performing data service (design generation and data integration) as well as data access and analysis (542 and 544) in accordance with the definition in the XML.

Once data analysis is completed by the AI-DAS server, the server component returns the analyzed data (step 6) and the response (step 7) is provided to the HTML page. The response may be formatted in accordance with the definition in the XML page. The response is then returned to the UI device 504 for viewing by the user and for interaction by the user (step 8)

Figure 6:
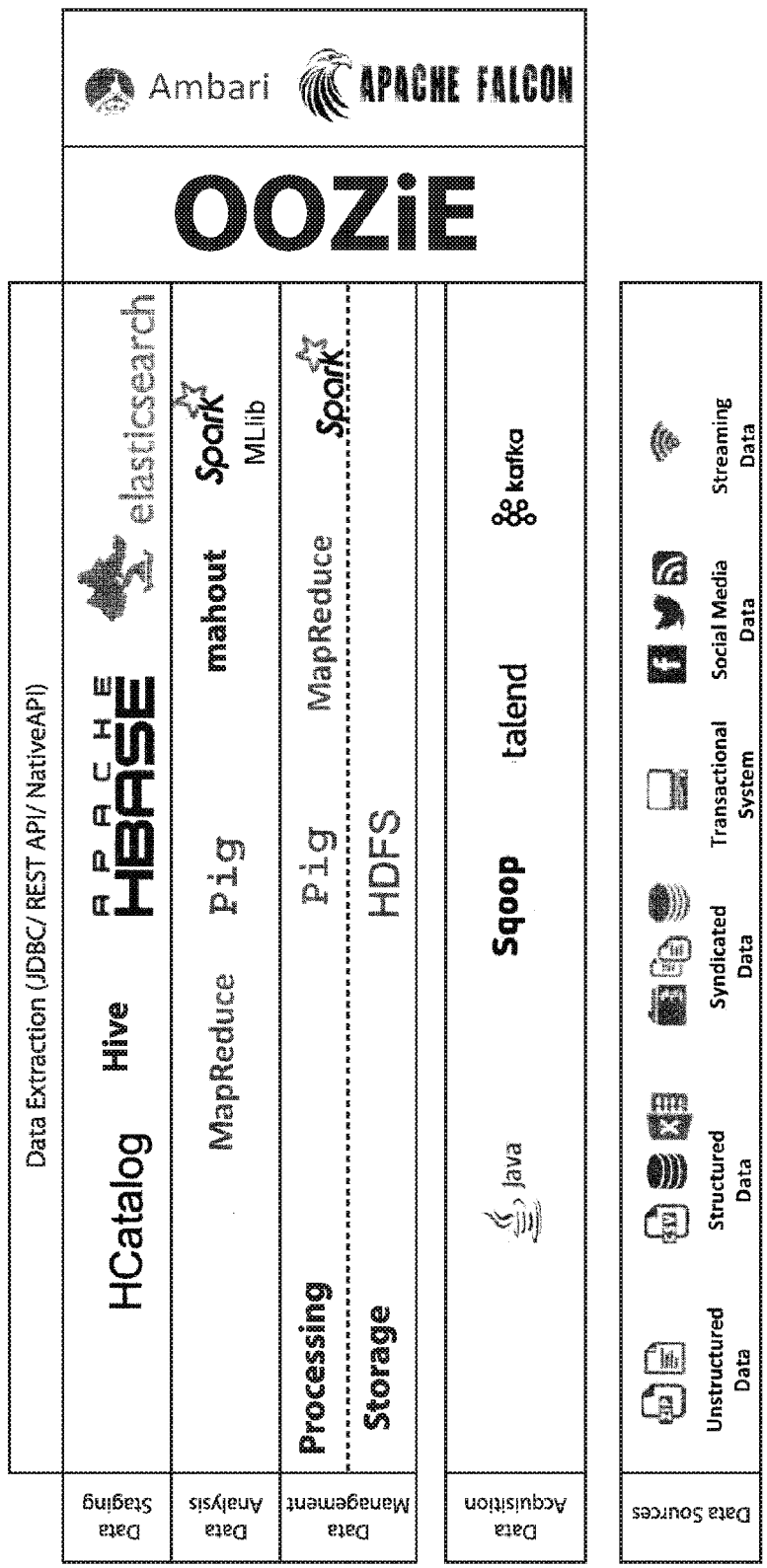
FIG. 6 shows some of the technologies involved in implementing the data sourcing, data acquisition, data management, data analysis, data staging, and data extraction.

FIG. 6 shows some of the technologies involved in implementing the data sourcing, data acquisition, data management, data analysis, data staging, and data extraction. Some of these technologies are well-known in distributed computing/big data for storage (such as Hadoop) and for analysis (such as MapReduce, Spark, Mahout). Workflow engine may be provided by OOZIE while system administration may be provided by Ambari and Apache Falcon.

It should be noted that the technology details of FIG. 6 are hidden from the design/implementer during design time since the designer/implementer needs only be concerned with the metadata population and any optional HTML/JS customization for data outputting. These technology details are also hidden from the customer/user during execution since the customer/user only needs to issue a query that can be parsed to obtain the associated XML, and the rest of the analysis and underlying details regarding technology are handled transparently.

Figure 7:
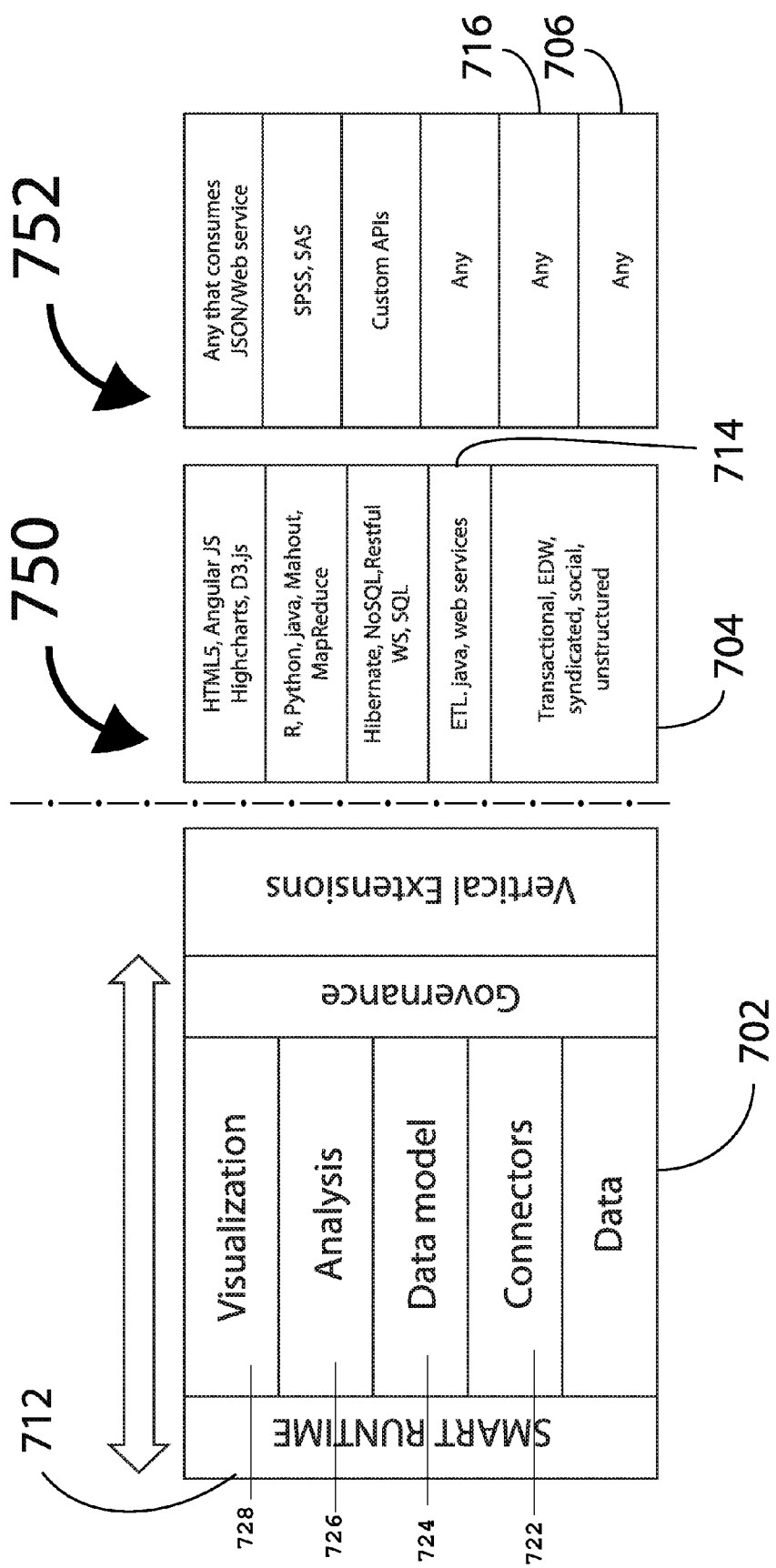
FIG. 7 shows some of the technologies employed in implementing each of the technology stacks in the AI-DAS system.

FIG. 7 shows some of the technologies employed in implementing each of the technology stacks in the AI-DAS system. For example, the data layer 702 may be implemented by (704) transactional, enterprise data warehouse (EDW), syndicated, social, and unstructured data. However, any other alternative data source (706) may be employed.

Connectors layer (712) may be implemented by (714) ETL, Java, Web services. However, any appropriate alternative integration connecting technology (716) may also be employed. The same applies to the data model layer 722, data access layer 724, analysis layer 726, and visualization layer 728. For each of these layers, there is a corresponding list of example technologies in the stack 750 as well as in alternatives/integration 752. One important point to note is since the underlying technology is hidden, the layers (such as data, connectors, data model, data access, and the analysis, visualization) may be implemented by any appropriate technology, including legacy technology.

As can be appreciated from the foregoing, embodiments of the invention renders it unnecessary for the designer/implementer to know or to manipulate complex technology in the implementation, maintenance, or upgrade of a data analysis system. The metadata layer abstracts these complex technology details away and provide standardized, easy-to-implement way of specifying how the DAS system should operate to solve any particular analysis problem.

As long as the subcomponents comply with the API model for interoperability, the underlying technology may be interchangeable on a plug-and-play basis. The ease with which the AI-DAS system can be implemented (due to the abstraction of the complex technology details away from the designer/implementer) encourages exploration and renders implementation, maintenance, and upgrade of a data analysis system substantially simpler, faster, and less costly than possible in the current art.

Information, both in its unstructured and structured form, is valuable to the Governance, Risk Management and Compliance (GRC) effort of an organization. Generally speaking, Governance, Risk Management, and Compliance (GRC) are three pillars that work together for the purpose of assuring that an organization meets its objectives. Governance is the combination of processes established and executed by the board of directors or management that are reflected in the organization's structure and how it is managed and led toward achieving goals. Risk management is predicting and managing risks that could hinder the organization to achieve its objectives. Compliance with the company's policies and procedures, laws and regulations, strong and efficient governance is considered key to an organization's success.

GRC may be thought of as a discipline that aims to synchronize information and activity across governance, risk management and compliance in order to operate more efficiently, enable effective information sharing, more effectively report activities and avoid wasteful overlaps. Although interpreted differently in various organizations, GRC typically encompasses activities such as corporate governance, enterprise risk management (ERM) and corporate compliance with applicable laws and regulations.

In the examples and disclosure herein, healthcare organizations are often mentioned. It should be understood, however, that embodiments of the invention apply without limitation to any organization or groups of organizations, whether governmental or private or for-profit or non-profit, in any field of endeavor. Examples fields of endeavor include, without limitation, education, retail, high technology, life sciences, healthcare, energy, etc.

To elaborate, unstructured information represents information that tends not to follow any predefined format. Structured content, on the other hand, stores its data in predefined data fields, with each piece of information in each field clearly informing what the field and the data therein represent.

Information in a tax form is an example of structured content, with the taxpayer's name, address, income, etc. all being associated with appropriate data fields. Forum discussions by public members or blog entries or narrative feedback in a comment form, which may be written in conversational English for example, represent unstructured content wherein there may be no apparent organization to the various pieces of information provided.

In the past, health care organizations have attempted to collect unstructured information, such as narrative content and employ them to fulfill its goal of Governance, Risk Management and Compliance (GRC). However, this effort has not always been successful.

For example, the post-discharge procedure often includes an invitation for the patient to write comments on comment cards, or procedures for doctors/nurses to write a patient discharge summary. Much of this information in the past has been in paper form but with modern technologies, much has also been digitized.

Nevertheless, these various pieces of narrative contents are often filed away in the individual patient's folder, generally contributing little to GRC effort of the organization. As is usually the case, the only time these narrative contents tend to be reviewed is when there is a dispute with the patient. Only then would the individual patient file be reviewed, and both the patient's narrative feedback and the narrative comments by the medical staff are read to facilitate resolution of the dispute at hand. As mentioned, they contribute little to the ongoing GRC effort of the organization.

Further, the rise of the internet, with its various forums, blogs, social media sites, review sites, and the like also produce a massive amount of narrative contents. Some of these may be highly relevant to a given health care organization although such narrative contents may be generated externally outside of the health care organizations. For example, thousands or millions of people often voice their observations and opinions about the operation of various departments of the healthcare organization, about the care they or those they know received, about dealing with the various department and personnels of the healthcare organization, about their opinion toward various aspects of the healthcare organization. These external narrative contents often reflect the sentiments and attitudes of the consuming public (such as the patients or potential patients) toward the health care organization and/or its various aspects of operation. There has yet been a satisfactory attempt at mining these external narrative contents with a goal of using the information therein to improve the GRC effort of the health-care organization.

Other forms of unstructured data, other than patient or public narration, also exist. As an example, drug salespeople often memorialize the sales process via reporting emails or internal intranet posts to colleagues and supervisors. If a salesperson is attempting to generate sales from a particular drug by pushing it for an unapproved use, an off-label sales situation may exist. This represents a risk to an organization. If this information is mentioned in an email or a posting anywhere, for example, this information should be captured for GRC purpose.

As another example, warehouse personnels may discuss work-related issues with one another via emails or via internal or external social media sites. If inadequate temperature or moisture control is discussed, this represents a risk to the products produced or maintained by the healthcare organization. If this information is mentioned in an email or a posting anywhere, for example, this information should be captured for GRC purpose.

As another example, some drugs may be sold on the grey market in an unauthorized manner by authorized buyer or by insiders. As another example, a hacking website may discuss the successful or attempt infiltration of the healthcare organization data infrastructure. If this information is presented in an onsite auction site, or discussed in a posting or email anywhere, this information should also be captured for GRC purpose.

Other sources of unstructured content also exist. For example, third parties often collect data, conduct interviews and compile reports on various health organizations or health care technologies or trends. These third party data sources are often syndicated and can be obtained to understand the sentiments and attitudes of stakeholders toward a given health care organization or an aspect of its operation.

One of the difficulties in assembling and analyzing unstructured data is the sheer volume and the apparent lack of organization of data therein. The other reason for the difficulties is more subtle. Even if the unstructured data can be collected from the various sources and digitized, unless the proper insight could be obtained from the unstructured data, the collection effort is meaningless.

In the past, health care organizations have attempted to form committees of human readers to tackle the unstructured information available to assist in its GRC goals. Each committee member may be asked to read a subset of the unstructured information from one or more sources and to form an opinion about what has been read. The committee members may then meet and decide on the important issues to be addressed based on the unstructured information read by its various members. However, such approach is inherently unscalable and relies on the fragile human recollection and impression. It is also inherently unreliable and highly subjective.

What is desired are more objective, scalable, and automated systems and methods for obtaining insights from structured and unstructured information from various sources to drive improvement in the GRC effort of the health care organization.

Embodiments of the invention relate to methods and apparatus for aggregating information, both unstructured and structured information, from a variety of data sources internal and external to the enterprise, applying natural language processing to analyze the aggregated information with techniques such as sentiment analysis (SA), emotion analysis (EA) and topic analysis (TA) in order to obtain mapped Risk Control Matrices (RCMs) and/or insights/recommendations that can be used to implement or improve the GRC processes of a healthcare organization.

In the following discussion, narrative information is emphasized and examples are often directed toward the aggregation and analysis of narrative data. It should be kept in mind, however, that narrative data is only an example of unstructured data and the aggregated data for analysis can include both structured information and unstructured information of various types.

In one or more embodiments, the aggregated information from the structured and unstructured data sources is correlated with metadata about the organization structure or operation or policies (e.g., which department, which operation, which hospital). The correlation with metadata permits the obtained attributes (e.g., sentiment, emotion, topics) to be calibrated commensurate with the scope of the business query (e.g., risks pertaining to financial control in purchasing in department ABC of hospital XYZ).

In the first example business query ("What are the financial control risks in the purchasing group of department ABC of hospital XYZ"), the metadata correlation allows the scope of the query to be limited to what are most relevant, i.e., purchasing group of department ABC and XYZ hospital.

In one or more embodiments of the invention, advanced data science techniques pertaining to correlation or causation analysis are employed to determine, from the aggregated information and the metadata, the correlation and/or causation factors of risks. These are the contributing factors, or contributors.

For example, a hospital may wish to know not only which sales group has off-label sales risk for drugs but also why. The contributing factors uncovered in the aggregated data may be the pressure with which salesperson are pushed to make sales, the lack of training, the failure to instill information discipline when introducing drugs, the financial incentives that lead to off-label sales. In one or more embodiments, these factors may be weighted to more accurately provide insights. For example, the sales pressure may be given very low weight since it is quite difficult to quantify whether sales pressure will lead to unethical off-label sales or more of the desirable, ethical sales. On the other hand, the lack of training may be given higher weight since many salespeople mentioned they were never told that selling drugs for unapproved purposes was prohibited.

Thus the analysis provides not only an indication of a problem (off-label sales) but also a possible way to remedy the problem (the reason why off-label sales occur in hospital KLM and how to correct). Knowing why and how to correct may also allow that hospital or other hospitals to reduce off-label sales risk.

To elaborate, topic analysis refers to the use of natural language processing to uncover one or more abstract "topics" that occur in one or more documents (such as blog postings, summaries of discharge write-ups, comment card entries, etc.). An example topic may be "segregation of duties" in the context of financial control risks to prevent a single person from being able to both write and approve checks. Another topic may be "questionable sales pitches" in the context of the identifying off-label sales. Another topic may be "warehouse conditions" in the context of identifying risks to storage of drugs in warehouses.

Sentiment analysis (also known as opinion mining) refers to the use of natural language processing to identify and extract the polarity (positive, negative, or neutral) toward a particular issue or topic.

Emotion analysis refers to the use of natural language processing to achieve finer granularity grading of the intensity of such polarity. To put it differently, emotions may capture shades of positives or shades of negatives and may include the subjective judgment thereof.

For example, a positive sentiment may encompass the emotions of happy (represented by words such as joyful or glad), pleasant (represented by words such as enjoy or nice), or relief (represented by words such as comfort or solace). A negative sentiment may encompass the emotions of fear (represented by words such as scare, fear or frightening), anxiety (represented by words such as anxious, worry or distress), unpleasantness (represented by words such as dislike, yuck or irksome), or anger (represented by words such as furious or antagonize).

In one or more embodiments, the process of aggregating the narrative and structured data as well as the scoring data from both the internal and external sources employs the earlier discussed data analysis system that partially or wholly utilizes cloud-based and/or big data techniques. Further, in one or more embodiments, the process of analyzing the aggregated data and/or providing insights also employ(s) the earlier discussed data analysis system that partially or wholly utilizes cloud-based and/or big data techniques. However, embodiments of the invention are not so limiting and any other suitable computing system and/or computing resource may be employed.

The features and advantages of embodiments of the invention may be better understood with reference to the figures and discussions that follow.

Figure 8:
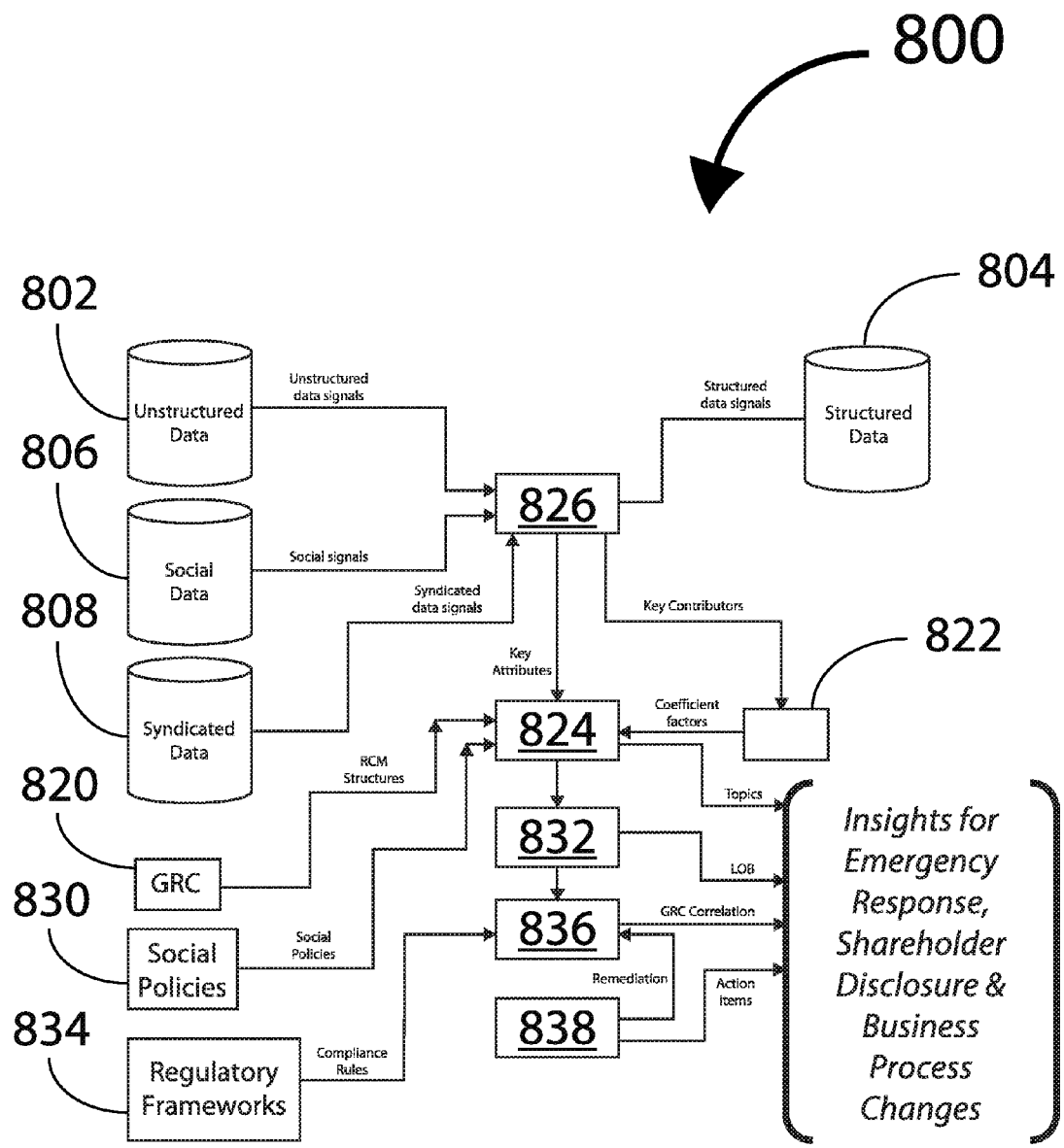
FIG. 8 shows, in accordance with an embodiment of the invention, a data flow representation of the Governance, Risk and Compliance Insight Engine.

FIG. 8 shows, in accordance with an embodiment of the invention, a data flow representation of the GRC Insight Engine (GRC-IE) 800. The GRC Insight Engine, as discussed, ingests structured and more importantly unstructured data from various sources to form aggregated data. The aggregated data is then processed using natural language processing (NLP) and other techniques to ascertain attributes and contributors. These attributes can be in the form of sentiment (i.e., positive, negative, or neutral), emotions, topics (e.g., trend, hot topics, topics specified to be important to the organization). These attributes are correlated with metadata to allow the business query to be calibrated with respect to any metadata parameter (e.g., by age, by location, by hospital, by department, by time, etc.) for relevance.

The contributors are factors that are analyzed to be correlated with or to be the cause of the attributes. These attributes and contributors can be processed together with risks relevant to the organization (as captured by the risk control matrices or RCMs) and media policy of the company (media announcement or publication may also be thought of as another risk to be avoided by adhering to the policy) to provide mapped RCMs or actionable insights and/or recommendations to improve.

Data source 802 is an unstructured internal data source, representing for example narrative data from sources internal to the organization. Examples include, without limitation, various write-ups by doctors or nurses or other employees of the healthcare organization, manager or salespeople feedback, surveys, transcripts of call center conversations with patients, transcripts of conversations or feedback collected by marketing or CRM (client relations management) systems, emails, postings in internal websites and blogs, and the like. The data may be collected and digitized in unstructured data source 802.

Data source 804 is a structured internal data source, representing the structured data collected by the organization. Examples include, without limitation, data from patient management databases, call center records, insurance databases, sales management systems, data from various enterprise resource planning and other enterprise data stores, and the like. Much of this data is already digitized or can be digitized and stored in structured data source 804.

Social data source 806 is a data store of social, forum, and/or blog unstructured data. Examples include, without limitation, posts in forums, blogs, or websites that focus on health care, information from general social media sites on the internet such as Facebook or Twitter or Instagram.

Syndicated data source 808 is a data store of third party data that provides raw or filtered data or processed data that may be of interest to the health care organization. Examples include, without limitation, news articles, published reports, private studies, private data compilations, rankings, scorings, surveys, and the like. Syndicated data source 808 may be either structured or unstructured.

Data sources 802-808 are only examples and should not be construed to be limiting of the sources or types of data that can be employed by embodiments of the GRC Insight Engine. Generally speaking, unstructured and structured data from these data sources 802-808 and others may be aggregated in logic and datastore block 820. In logic and datastore block 820, the data is aggregated, pre-processed in preparation for analysis by natural language processing (NLP) and other data processing techniques. As the term is employed herein, natural language processing may include the use of statistical and/or machine learning and may encompass the fields of text analysis as well as other computational linguistics techniques. NLP is a well-established field and will not be further elaborated here.

The outputs of block 820 are key attributes and key contributors. Key attributes include such things as sentiment, emotions, topics, all of which may be calibrated to the metadata values (e.g., attributes for the department, for the whole hospital, for specific days, for specific group of employees or specific departments, etc.). Sentiment may be positive, negative, or neutral. Emotion represent the subjective representation of the intensity of the sentiment, as discussed earlier (e.g., hate, avoid, accepting, satisfied, happy, elated, ecstatic intensity gradations). Risk-related topics can be analyzed for trending topics, the top (N) topics discussed, or the topics of special interest to the business, for example.

Key contributors are the variables that have been uncovered to be deemed correlated with or likely to be the cause of the attributes discovered. These are aspects of the actual experiences or perceptions of the stakeholders that give rise to the attribute. As discussed earlier, the attribute of "Off-label sales" may be contributed by (e.g., associated with the contributors) pressure to produce sales, lack of training, improper financial incentives, etc. if these are present in the aggregated data in 820.

Key contributors are provided to logic block 822 to derive coefficient factors, essentially allowing the contributors to be weighted. The factors to consider in assigning weights include the practicality of making changes to the experience contributor variable, the cost-benefit analysis of making the changes, the frequency the contributor variable was mentioned in the aggregated data, the relevance of that contributor variable, etc. Thus if the failure to timely record revenue was mentioned many times but the writing of check by the approving employee was mentioned only once or twice, the timely revenue recording contributor variable may be given a greater weight than that associated with the segregation of financial duties contributor variable.

The attributes and coefficient factors are then provided to logic and datastore block 824, where they are processed with the risk factors relevant to the healthcare organization (encapsulated in risk control matrices or RCMs) from block 820 and with the company's social media policy from block 830 to extract from the data the polarity, the topicality, and the emotion that are associated with any identified business risks. The polarity calculations may identify what percentage of comments has positive or negative feelings. The emotion calculation may identify the degree of emotional attachment to a comment over a range of emotions such as joy, anger, disgust, etc. toward the business risk. Topicality computations may aggregate the key risk-related topics that are being discussed across a wide source of information.

The polarity, topicality, and emotion data from block 824 are then mapped by mapper block 832 to relevant lines of business (LOB) functions within the business. For example, a negative comment or topic related to IT security breach will be mapped to the IT organization. As another example, a damaging brand comment will be mapped to the marketing function.

The polarity, topicality, and emotion data from block 824 are also processed (836) with data from regulatory framework (834) to form insights. For example, the polarity, topicality, and emotion data may be mapped to the RCM (Risk Control Matrices) provided by block 820. In an embodiment of the invention, the mapped RCMs, representing one form of insight, may then be provided to relevant response teams to enable these teams to respond to, for example, specific high priority risk elements that were identified by the GRC system and mapped as red signals by logic block 836.

Furthermore, the polarity, topicality, and emotion data and/or mapped RCMs may be processed with regulation data to refine the mapped RCMs and/or to form insights. Regulation data source 834 represents the data store for compliance rules regarding patient care, patient privacy, record keeping, financial reporting, sales ethics and regulations, safety regulations, etc. Health care is a highly regulated business and the analysis together with the compliance rules ensures that the refined mapped RCMs and/or resulting proposed insights or proposed recommendations comply with the compliance rules.

Other business considerations (such as available/possible business processes) may also be incorporated into the analysis of block 836 in the forming of the insights. The business process data may include for example procedural constraints, structural constraints, time constraints, human resource constraints, budget constraints, etc. The inclusion of the business process data ensure that the refined mapped RCMs and/or GRC insights or recommendations generated are suitable given the company's business processes. In other words, the analysis includes business process considerations to ensure that the mapped RCMs and/or insights or recommendations provided to improve GRC are actionable (i.e., practical and/or implementable given the constraints of the business processes available to the organization) and comply with all relevant regulations.

Logic block 840 represents audit/improvement data that address inefficiencies, issues, or concerns. This data may come from, for example, audit processes or may be independently proposed ideas that are derived independent of the aggregated data. The audit/improvement data may be fed into logic and datastore block 836 to further tune the proposed insights/recommendations or reported as action items to relevant personnel to improve the GRC insight generation process.

The GRC insights/recommendations may then be provided to interested persons and/or entities (e.g., department, line of business) for consideration to improve the organization.

Figure 9:
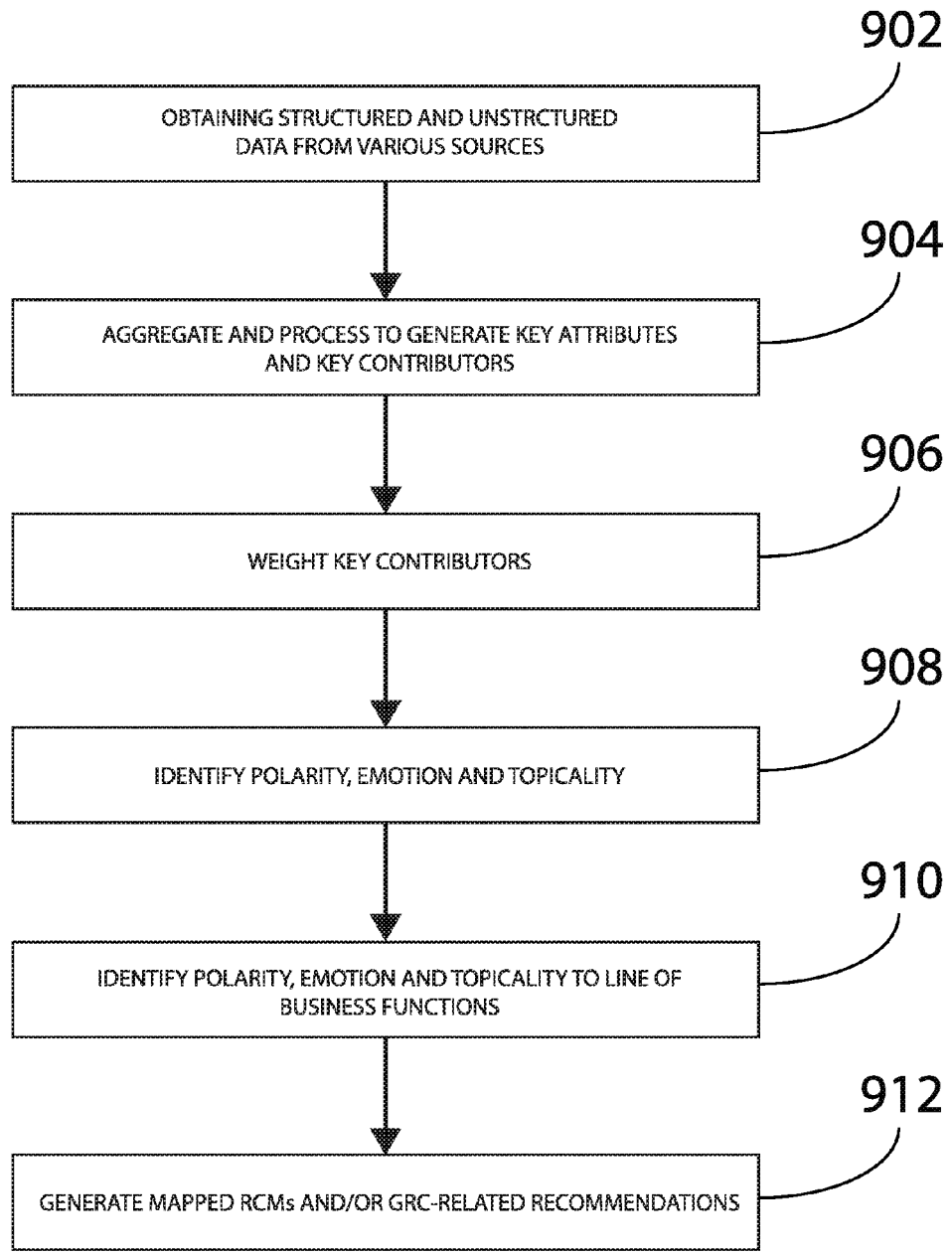
FIG. 9 shows, in accordance with an embodiment of the invention, the steps for deriving mapped Risk Control Matrices and/or insights/recommendations from the structured and unstructured data.

FIG. 9 shows, in accordance with an embodiment of the invention, the steps for deriving mapped RCMs and/or GRC insights/recommendations from the structured and unstructured data. In step 902, the structured and unstructured data is obtained from various data sources. In step 904, the structured and unstructured data is aggregated and processed using NLP and other data processing techniques to generate the key attributes and key contributors. The key contributors are weighted to provide coefficient factors in step 906.

In step 908, the weighted contributors and the attributes are processed together with the risk factors relevant to the business (e.g., all possible risk factor identified by internal GRC systems) and social media policies to identify polarity, topicality, and emotion of various risk-related comments or data items.

In step 910, the polarity, topicality, and emotion data are mapped to various LOB functions of the company and provided to such LOB functions for review.

In step 912, the polarity, topicality, and emotion data are processed with the regulator data and other business data and/or any audit/improvement data to generate the mapped RCMs and to form GRC insights/recommendations.

It should be noted that the outputs of one or more of logic blocks 820 (key attributes or key contributors), 822 (weights/coefficients), 824 (polarity, topicality, and emotion data) or 836 (mapped RCMs or proposed insights/recommendations) may be provided as outputs on their own to any sufficiently authorized interested persons or entities in the organization.

As can be appreciated from the foregoing, embodiments of the invention provide a data-driven approach for obtaining attribute and contributor data, and ultimately mapped RCMs and actionable insights from the structured and unstructured data from various sources. The use of natural language processing permits the unstructured data to be mined to obtain relevant attributes and associated contributors, thus making use of a voluminous resource of data that has thus far been judged to be too subjective, too unorganized or too difficult to analyze for GRC purposes. By analyzing the aggregated data with business rules and/or regulatory compliance rules, practical actionable GRC insights and recommendations are possible.

While this invention has been described in terms of several preferred embodiments, there are alterations, permutations, and equivalents, which fall within the scope of this invention. The invention should be understood to also encompass these alterations, permutations, and equivalents. It should also be noted that there are many alternative ways of implementing the methods and apparatuses of the present invention. Although various examples are provided herein, it is intended that these examples be illustrative and not limiting with respect to the invention.

What is claimed is:

1. A computer-implemented method for improving Governance, Risk and Compliance (GRC) procedures using insights from aggregated data pertaining to an organization, said aggregated data including at least unstructured data, comprising:
    processing said aggregated data using natural language processing to generate a set of attributes wherein each attribute includes a topic, sentiment and emotion;
    calculating a polarity for the set of attributes, wherein the polarity is a percentage of the attributes within the set of attributes which have a positive sentiment versus a negative sentiment;
    processing said aggregated data using natural language processing to generate a set of contributors, said set of contributors correlated with said set of attributes;
    extracting business risks from a risk control matrix for the organization;
    extracting from the set of attributes topics, polarity and emotions that are associated with the business risks;
    mapping the extracted topics, polarity and emotions to lines of business functions;
    mapping the extracted topics, polarity and emotions to the risk control matrix to generate insights; and
    providing the insights to response teams within the lines of business functions to improve the GRC procedures by reducing the business risks.

2. The computer-implemented method of claim 1 wherein said natural language processing to generate the set of attributes includes topic analysis and said set of attributes includes topics.

3. The computer-implemented method of claim 1 wherein said natural language processing to generate the set of attributes includes sentiment analysis and said set of attributes includes sentiments.

4. The computer-implemented method of claim 1 wherein said natural language processing to generate the set of attributes includes emotion analysis and said set of attributes includes emotions.

5. The computer-implemented method of claim 1 wherein said analyzing also employs business rules pertaining operation of said organization.

6. The computer-implemented method of claim 1 wherein said analyzing also employs regulatory rules.

7. The computer-implemented method of claim 1 wherein said aggregated data comes from multiple data sources.

8. The computer-implemented method of claim 1 wherein said aggregated data includes structured data.

9. The computer-implemented method of claim 1 wherein said unstructured data includes social media data.

10. The computer-implemented method of claim 1 wherein said unstructured data includes blog data.

11. The computer-implemented method of claim 1 wherein said unstructured data includes narrative data obtained from sources internal to said organization.

12. The computer-implemented method of claim 1 wherein said set of contributors are associated with weights prior to said analyzing.

13. A computer-implemented method for analyzing data pertaining to at least an organization, said analyzing being responsive to a query, comprising:
    aggregating unstructured data from various data sources to form aggregated data;
    processing said aggregated data using natural language processing to generate a set of attributes, wherein said set of attributes are correlated with values of metadata specified in said query, said metadata pertaining experiences with said organization that give rise to said unstructured data, wherein each attribute within said set of attributes includes a topic, sentiment and emotion, and wherein the set of attributes represent a set of topics, a set of sentiments, and a set of emotions;

calculating a polarity for the set of attributes, wherein the polarity is a percentage of the attributes within the set of attributes which have a positive sentiment versus a negative sentiment;

extracting business risks from a risk control matrix for the organization; and processing said set of attributes to generate a set of insights by mapping the set of topics, the set of polarities and the set of emotions to the risk control matrix and a set of recommendations provided to response teams in the organization to improve an aspect of a governance, risk, and compliance program of said organization.

14. The computer-implemented method of claim 13 wherein said natural language processing to generate the set of attributes includes topic analysis and said set of attributes includes said set of topics.

15. The computer-implemented method of claim 13 wherein said natural language processing to generate the set of attributes includes sentiment analysis and said set of attributes includes said set of sentiments.

16. The computer-implemented method of claim 13 wherein said natural language processing to generate the set of attributes includes emotion analysis and said set of attributes includes said set of emotions.

17. The computer-implemented method of claim 13 wherein said aggregating includes aggregating structured data to form said aggregated data.

18. The computer-implemented method of claim 13 wherein said unstructured data includes social media data.

19. The computer-implemented method of claim 13 wherein said unstructured data includes blog data.

20. The computer-implemented method of claim 13 wherein said unstructured data includes narrative data obtained from sources internal to said organization.

21. A computer-implemented method for obtaining recommendations for improving a governance, risk, and compliance program of an organization, said obtaining recommendations being performed in response to a query, comprising:

aggregating unstructured data from various sources to form aggregated data;

processing said aggregated data using natural language processing to generate a set of attributes, said set of attributes being correlated with values of metadata, said metadata pertaining risk factors with said organization that give rise to said unstructured data, said values of metadata being specified in said query, wherein each attribute includes a topic, sentiment and emotion;

calculating a polarity for the set of attributes, wherein the polarity is a percentage of the attributes within the set of attributes which have a positive sentiment versus a negative sentiment;

processing said aggregated data using natural language processing to generate a set of contributors, said set of contributors being correlated with said set of attributes;

extracting from the set of attributes topics, polarity and emotions that are associated with the risk factors;

mapping the extracted topics, polarity and emotions to a risk control matrix to generate insights;

generating the recommendations based upon the insights; and providing the recommendations to response teams within the organization to improve the GRC procedures by reducing the risk factors.

* * * * *